Jan. 30, 1934.  C. A. THOMAS  1,945,239
VEGETABLE CUTTER
Filed Nov. 20, 1931
Fig. I.
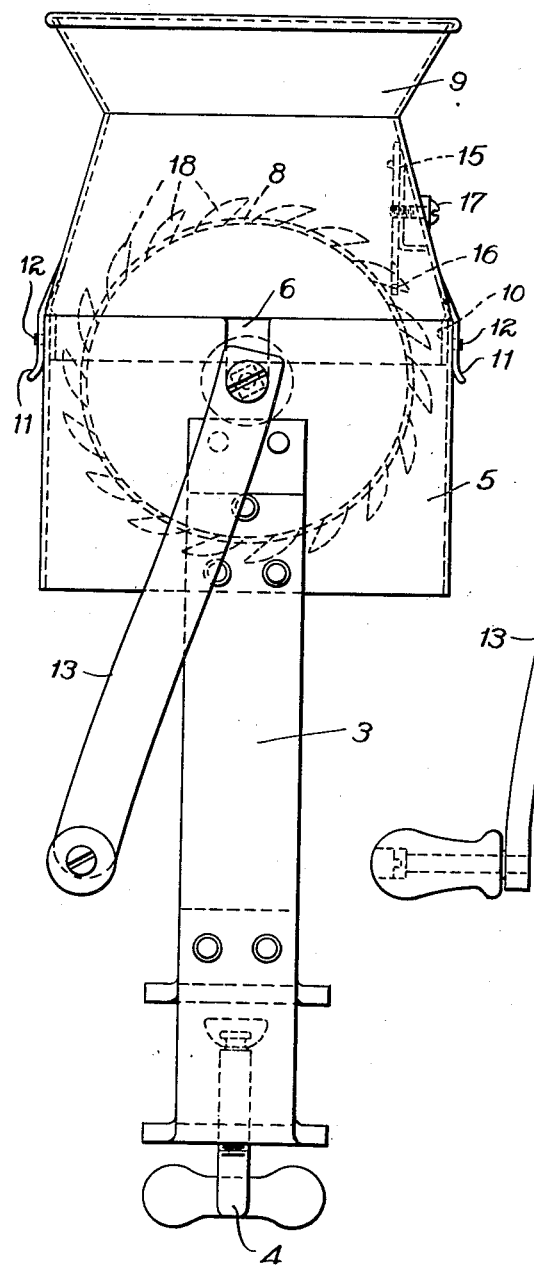
Fig. 2.
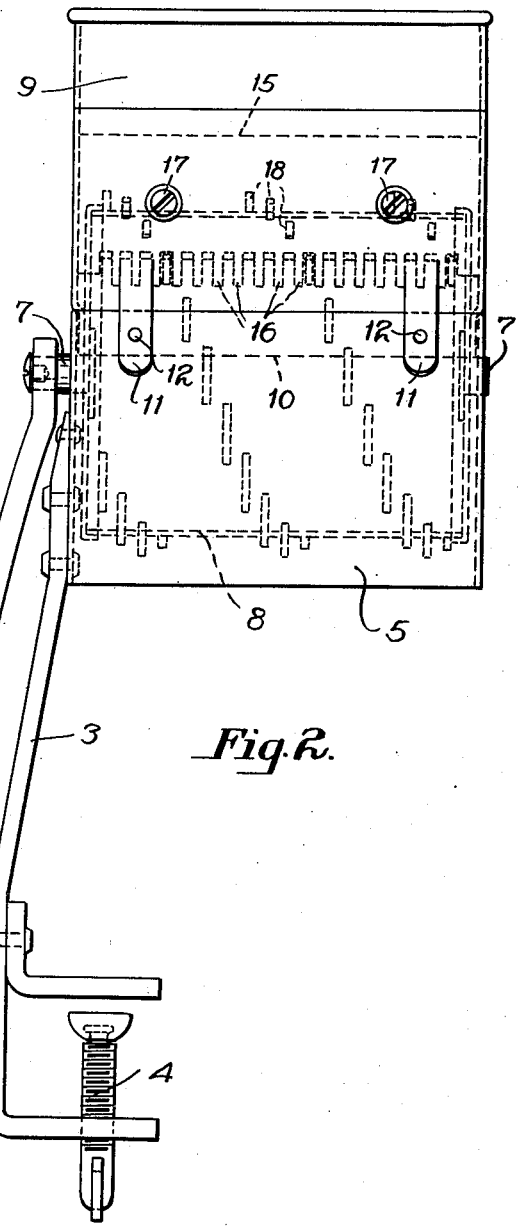
INVENTOR
Clifford A. Thomas,
By Archworth Martin,
Attorney.

Patented Jan. 30, 1934

1,945,239

UNITED STATES PATENT OFFICE 1,945,239

VEGETABLE CUTTER

Clifford A. Thomas, Yakima, Wash.

Application November 20, 1931
Serial No. 576,271

1 Claim. (Cl. 146—91)

My invention relates to vegetable cutters, fruit cutters, and the like, and has for one of its objects the provision of a cutting device of such form that fruits or vegetables may be cut into particles of substantially uniform size without excessive crushing or bruising of the vegetables, and without causing discoloration thereof.

Another object of my invention is to provide a cutting device of such form that the knives or cutting teeth thereof are not likely to become clogged, and wherein choking of the cutting apparatus is avoided.

Still another object of my invention is to provide an apparatus of simple form that may be conveniently assembled and disassembled, and which is nevertheless effective in operation, and which may be operated by an inexperienced person with a minimum danger of injury.

One form which my invention may take is shown in the accompanying drawing wherein Figure 1 is a side elevational view of the cutting apparatus, and Fig. 2 is a front elevational view thereof.

The apparatus is shown as mounted upon a supporting bracket 3 that may be secured to a table or shelf by a clamping screw 4 of any suitable type. The standard 3 supports a bottom casing 5 which may be of sheet metal, aluminum, or other suitable material. The casing 5 is open at its upper and lower ends, and is provided in its opposite sides with slots 6 for the reception of shaft-like extensions 7 of a drum 8, which may be formed of sheet metal, and which is completely sealed, to prevent access of fruit juices or other material to the interior of the drum.

An upper casing 9 has a lower edge or rim portion 10 of reduced diameter, fitting within the upper side of the casing 5, and which is provided with latches 11 that snap into engagement with ears or lugs 12 that are secured to the sides of the casing 5.

The casings 9 and 5 can be readily separated by springing out the ears 11 and lifting the casing 9 away. The drum 8 and the handle or crank 13 that is secured thereto can then be lifted from the casing 5, all parts of the apparatus thereupon being readily accessible for cleaning.

A stationary cutting member 15, consisting of a body portion having teeth 16 on its lower edge, is detachably secured to the casing 9 by means of screws 17. The vertical edges of the teeth 16 function as cutting knives, in cooperation with teeth 18 carried by the drum 8.

The teeth 18 are shown as arranged in groups, the teeth of each group being disposed in helical lines about the surface of the drum, and only a few of the teeth 18 are in cooperative relation with the teeth 16 at any given time. However, the teeth 18 could, of course, be arranged in rows parallel to the axis of the drum, if desired. The outermost ends of the teeth 18 serve as cutting edges as do also their longitudinally-extending foremost corners, so that each tooth 18 has three cutting edges. The leading edges of the teeth 18 are disposed on lines tangential to a circle drawn about the axis of the drum 8. These edges cooperate with the cutting edges of the teeth 16 and serve to cut the vegetables into particles without excessively crushing and squeezing the same, as above-indicated. The particles of fruit will fall through the casing 8 into a suitable receptacle.

It will be understood that the shape and the size of the teeth 16 and 18 will depend upon the character of material being operated upon, as well as the size of particles desired. The knife block 15 can be readily changed for a block having teeth of another size, and another drum having teeth of other dimensions can be substituted for the drum 8.

I claim as my invention:—

Cutting apparatus comprising a drum rotatable on a horizontal axis, the drum carrying teeth whose outer ends have sharpened cutting edges extending parallel to the axis of the drum and whose forward edges are disposed on lines substantially tangential to a circle drawn about the axis of the drum and whose rear edges are convex, and a vertical plate having stationary teeth depending from its lower edge, the teeth being spaced apart and positioned to permit the first-named teeth to pass between them during rotation of the drum, the stationary teeth having their working faces disposed in vertical planes and below a plane at the uppermost portion of the drum.

CLIFFORD A. THOMAS.